United States Patent
Ricco et al.

(10) Patent No.: US 6,805,104 B2
(45) Date of Patent: Oct. 19, 2004

(54) SYSTEM AND METHOD FOR FEEDING LPG BY INJECTION FOR AN INTERNAL COMBUSTION ENGINE

(75) Inventors: Mario Ricco, Casamassima (IT); Sisto Luigi De Matthaeis, Modugno (IT); Claudio Amorese, Corato (IT); Onofrio De Michele, Castellana Grotte (IT)

(73) Assignee: C.R.F. Societa Consortile Per Azioni, Turin (IT)

( * ) Notice: Subject to any disclaimer, the term of this patent is extended or adjusted under 35 U.S.C. 154(b) by 0 days.

(21) Appl. No.: 10/747,081

(22) Filed: Dec. 30, 2003

(65) Prior Publication Data

US 2004/0149270 A1 Aug. 5, 2004

(30) Foreign Application Priority Data

Dec. 31, 2002 (IT) .................................... TO2002A1136

(51) Int. Cl.[7] ............................................. F02M 37/04
(52) U.S. Cl. ...................... 123/495; 123/497; 123/509; 123/446

(58) Field of Search ................................. 123/446, 495, 123/457, 458, 497, 509

(56) References Cited

U.S. PATENT DOCUMENTS

| | | | | |
|---|---|---|---|---|
| 4,606,322 A | * | 8/1986 | Reid et al. ................... | 123/575 |
| 5,542,398 A | * | 8/1996 | Marcon ....................... | 123/527 |
| 5,592,924 A | * | 1/1997 | Audisio et al. ............. | 123/525 |
| 6,050,237 A | * | 4/2000 | Ferrera et al. .............. | 123/276 |

* cited by examiner

*Primary Examiner*—Bibhu Mohanty
(74) *Attorney, Agent, or Firm*—Sughrue Mion, PLLC

(57) ABSTRACT

In a system for feeding LPG by injection for an internal combustion engine, sensor means are provided for measuring the electrical current absorbed by the electric motor for driving the feed pump. The operation of said electric motor is interrupted when the measured electrical current absorbed drops below a predetermined threshold value. The system thereby prevents the operation of the motor-pump assembly, which is immersed in the LPG within the LPG tank, when the level of LPG in the tank drops below a minimum admissible value. Simultaneously to the interruption of the operation of the electric motor an auxiliary petrol feed system is activated.

5 Claims, 2 Drawing Sheets

SYSTEM AND METHOD FOR FEEDING LPG BY INJECTION FOR AN INTERNAL COMBUSTION ENGINE

BACKGROUND OF THE INVENTION

The present invention relates to systems for feeding LPG by injection for internal combustion engines of motor vehicles. Fuel feed systems of this kind are already known for example from European patent EP-B-0 725 205 by the same Applicant and from the corresponding U.S. Pat. No. 5,592,924. Additional patents relating to this field are the Patent EP-B-0 922 851 by the same Applicant and the corresponding U.S. Pat. No. 6,050,237.

According to the prior art, fuel feed systems of this kind comprise:
- an LPG tank,
- a plurality of injectors associated with the cylinders of the engine, for injecting the LPG in the liquid state into said cylinders,
- a manifold or rail for feeding the LPG to said injectors,
- a conduit for feeding LPG from the tank to the aforesaid rail,
- a return conduit for bringing back to the tank the excess LPG fed to the injectors,
- a pump immersed in the LPG inside the tank, to feed the LPG through the LPG feed conduit, and
- an electric motor for driving the pump.

In the fuel feed systems of the kind described above, it is necessary to prevent the electric motor driving the pump to continue operating when the LPG inside the tank falls below a predetermined minimum level. In this condition, the pump starts drawing only vapour and the electric motor is no longer cooled by the LPG present inside the tank, with the consequent risk of failure of the motor. To prevent this condition from occurring, known systems exploit the level sensor usually provided within the tank to interrupt the operation of the electric motor driving the pump and activate an auxiliary petrol feed system with which the engine is also provided.

The drawback of this prior art is that the signal of the level sensor has relatively poor reliability, because it is subjected to inaccurate measurements due to the movements of the vehicle aboard which the engine is mounted. It must also be considered that the motor-pump assembly inside the tank is positioned within a separate container communicating with the remaining capacity of the tank through a restricted passage positioned adjacent to its bottom, whose purpose in fact is to make the part of liquid inside which the motor-pump assembly is immersed less prone to being tossed about as a result of the movements of the vehicle. However, this arrangement entails the fact that the level within said container may be different from the level in the remaining part of the tank, which is measured by the sensor level. Obviously, it would be desirable to control the operation of the motor-pump assembly according to the level within the container within which said assembly is positioned.

SUMMARY OF THE INVENTION

To solve the aforesaid problems, the present invention relates to a fuel feed system having all the characteristics set out above and further characterised in that it comprises:
- sensor means for measuring the electrical current absorbed by the motor driving the pump, and
- actuator means for interrupting the operation of the electric motor driving the pump when the aforesaid sensor means detect a lowering of the current absorbed by the electric motor below a predetermined threshold value.

Preferably, the aforesaid actuator means are also able to emit a signal which activates an auxiliary petrol feed system.

The invention further relates to a method for feeding LPG for an internal combustion engine, using a system having the characteristics which have been indicated at the start of the present invention and characterised in that the electrical current absorbed by the electric motor driving the pump is measured and the operation of said electric motor is interrupted when the measured value of the absorbed current is lower than a predetermined threshold value.

Preferably, in the method according to the invention, when a drop in the current absorbed by the electric motor driving the pump below the aforesaid threshold value is detected, an auxiliary petrol feed system is also activated automatically.

In the preferred embodiment of the system and of the method according to the invention, the aforesaid auxiliary petrol feed system is automatically selected if the engine is started when the temperature of the engine coolant is lower than a predetermined minimum value. Also in the aforesaid preferred embodiment, when the operating temperature exceeds the aforesaid predetermined minimum value, the system automatically switches the fuel feed from petrol to LPG. As described above, the operation with LPG fuel feed continues until, due to the consumption of the LPG in the tank, an absorption of electrical current is detected that is lower than the aforesaid predetermined threshold value, in which case the system automatically switches the fuel feed from LPG to petrol.

Thanks to the characteristics set out above, a much more reliable control is obtained over the correct operation of the electric motor driving the feed pump. The current absorbed by the electric motor when the pump is pumping only vapour drops by 40–50%, on average, relative to the values corresponding to a normal operation of the pump with a suction on a liquid substance. The system is therefore able easily to detect the decrease in the quantity of liquid in the tank below the minimum acceptable value. At the same time, the result of a greater operating reliability is achieved with extremely simple means and at relatively low cost.

BRIEF DESCRIPTION OF THE DRAWINGS

Further features and advantages of the invention will be illustrated hereafter with reference to the accompanying drawings, provided purely by way of non limiting example, in which.

DETAILED DESCRIPTION OF THE INVENTION

Figure 1:
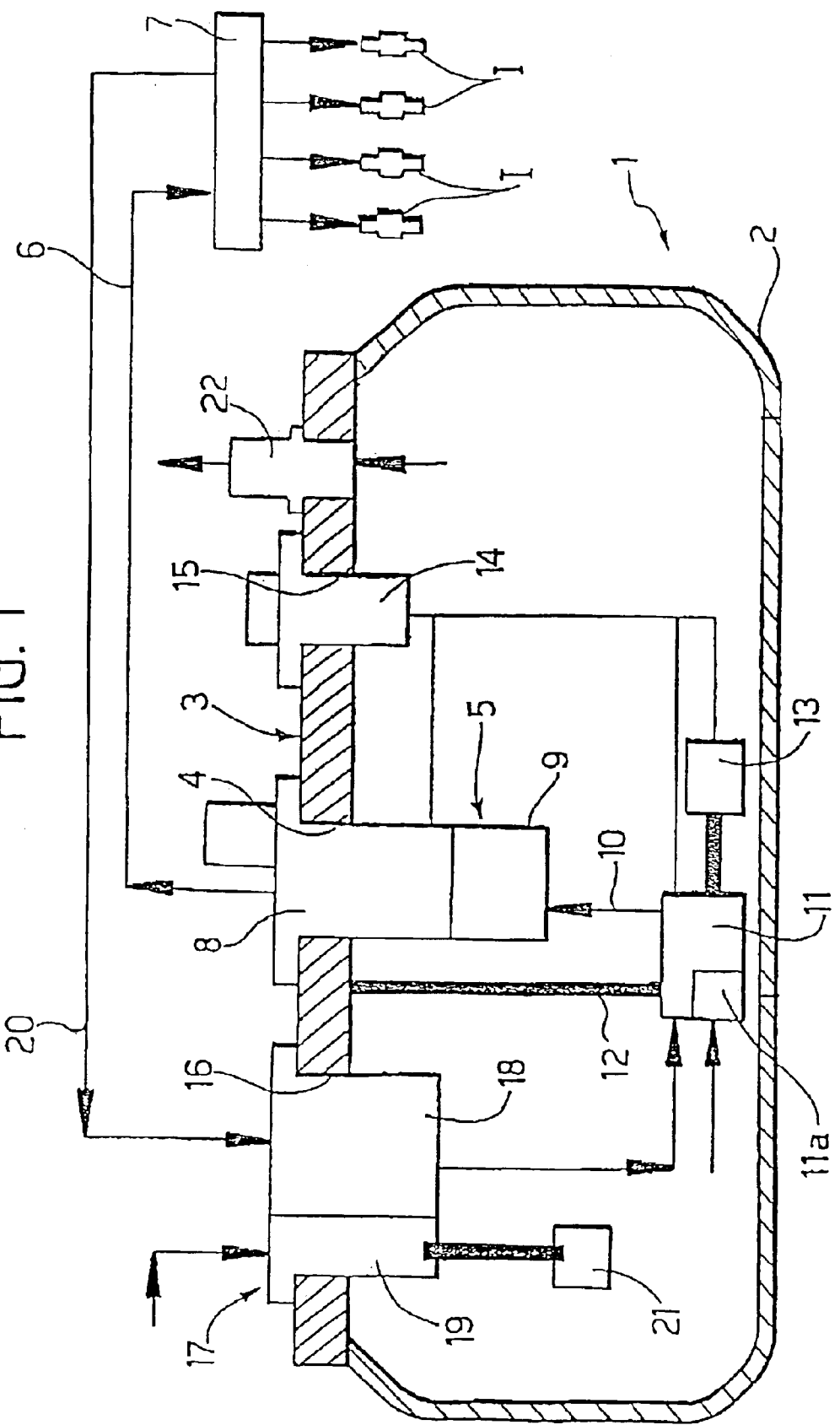
FIG. 1 is a schematic view of a system for feeding LPG according to the prior art.

In FIG. 1, the number 1 globally designates and LPG tank according to the prior art, to feed the LPG to a plurality of injectors I associated to the various cylinders of the engine. The tank 1 has a hollow structure 2 made in such a way as to assure its ability to withstand the operating pressures expected for a system of the type discussed herein. The hollow structure 2 has an upper opening closed by a service flange 3 bearing the various elements for joining and connecting the tank to the feed system. For this purpose, the tank 1 has a first through opening 4 through which is mounted the structure of an assembly 5 connected to a line 6 for the delivery of the LPG to a distribution manifold or rail 7, which distributes the LPG among the various injectors I. The assembly 5 includes a shut-off solenoid valve 8 destined to close, shutting off the communication of the tank with the exterior under predetermined emergency conditions, as well as a flow rate limiter valve 9. The assembly 5 receives the LPG through the line 10 of the pump 11 driven by an electric motor 11a whose structure is connected by means of a connection element 12 to the service flange 3. The pump 11 can in any case be constructed in any other way, as will also be indicated below. To the structure of the pump 11 is also connected the structure of a device 13 for sensing the LPG level. The electrical power supply of the solenoid valve 8, of the pump 11 and of the sensor 13 is assured by an electrical connector 14 which is mounted in a through opening 15 of the service flange 3. Said flange 3 also has an additional through opening 16 into which is mounted an assembly 17 comprising two valves 1819. The valve 18 is a return valve, which is connected to a line 20 for the flow, into the tank, of the excess LPG fed to the rail 7. The valve 19 is the valve used for filling the tank and it is associated to an additional level sensor 21. To the flange 3 is also associated a safety valve 22 which prevents the pressure inside the tank from exceeding a predetermined threshold value.

FIG. 1 shows a traditional solution of a tank in which the flange 3 has through holes traversed by the various components described above. The present invention could also be embodied with a tank having an innovative structure which is the subject of the prior Italian patent application no. TO2001A000360 by the same Applicant, in which at least some of the aforesaid components are fastened to the lower surface of the plate, without passing through it. Moreover, as stated previously, in the case of the invention the operation of the electric motor 11a is not controlled by a level sensor 13, but rather by the innovative means that will be described hereafter. Lastly, the mounting of the motor-pump assembly, in the preferred embodiment of the invention, is also different from the one indicated purely by way of example in FIG. 1, with reference to the prior art.

Figure 2:
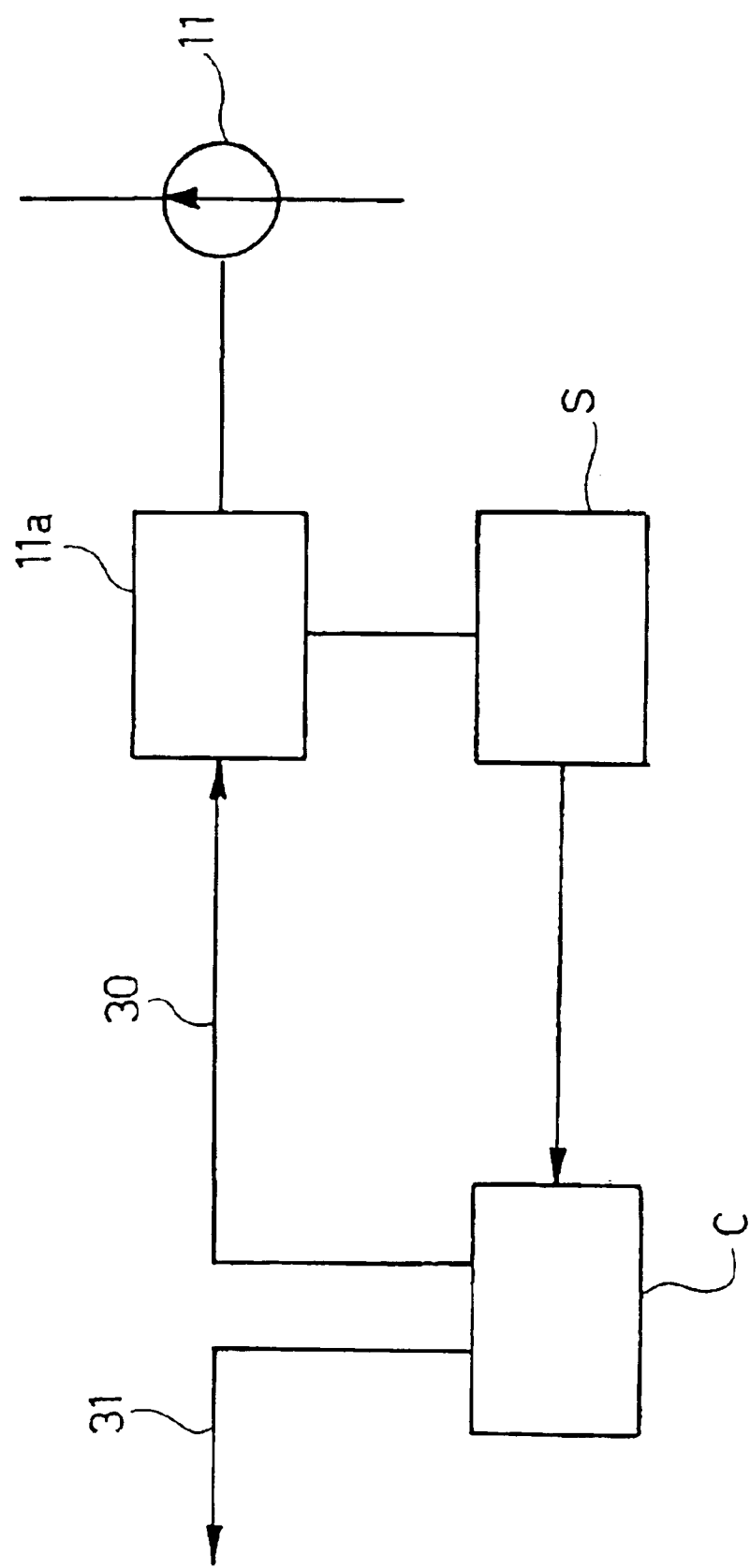
FIG. 2 is a block diagram of the system according to the invention.

With reference to FIG. 2, a block diagram is illustrated of the system according to the invention, which comprises sensors S able to measure the electrical current absorbed by the electric motor 11a driving the pump 11. The sensor means S send their output signal to electronic control means C which are programmed in such a way that when the sensor means S detect a reduction in the electrical current absorbed by the electric motor 11a below a predetermined threshold value, the output a signal 30 which interrupts the operation of the electric motor 11a and a signal 31 which activates the operation of an auxiliary petrol feed system (not shown) with which the engine is provided.

As indicated above, a much more precise and reliable measurement is thereby obtained than in the traditional system, in which the operation of the electric motor 11a is controlled by a sensor of the level of liquid within the tank. The signal output by the sensor means S is able to assure that the electric motor will be prevented from operating in conditions in which there is a high risk of damage to said motor. This result is obtained without risking unreliable evaluations due to the variations in the level of the liquid in the tank, caused by the movements of the vehicle, and continuing to assure the correct operation of the motor when the level within the container that surrounds it is sufficient, although the level in the remaining capacity of the tank is relatively low.

As was also previously stated, said result is obtained with extremely simple, low cost means.

Naturally, without altering the principle of the invention, the construction details and the embodiments may vary widely from what is described and illustrated purely by way of example herein, without thereby departing from the scope of the present invention.

What is claimed is:

1. A system for feeding LPG by injection for an internal combustion engine, comprising:
   an LPG tank,
   a plurality of LPG injectors associated to the cylinders of the engine, to inject LPG in the liquid state into said cylinders,
   a manifold or rail for feeding the LPG to said injectors,
   a conduit for feeding LPG from the tank to the aforesaid rail,
   a return conduit to return into the tank the excess LPG fed to the injectors,
   a pump immersed in the LPG present in the tank to feed the LPG through the LPG feed conduit, and
   an electric motor for driving the pump,
   wherein it further comprises:
   sensor means for measuring the electric current absorbed by the electric motor for driving the pump, and
   actuator means for interrupting the operation of the electric motor when the sensor means detect a lowering of the electrical current absorbed by the electric motor below a predetermined threshold value.

2. A feed system as claimed in claim 1, wherein the aforesaid actuator means are also able to emit a signal for activating an auxiliary petrol feed system.

3. A method for feeding LPG in an internal combustion engine, in which the following are provided:
   an LPG tank,
   a plurality of LPG injectors associated to the cylinders of the engine,
   a collector or rail for feeding the LPG to said injectors,
   a conduit for feeding LPG from the tank to the aforesaid rail,
   a return conduit to return to the tank the excess LPG fed to the injectors,
   a pump immersed in the LPG present in the tank to feed the LPG through the LPG feed conduit, and
   an electric motor for driving the pump,
   wherein the electrical current absorbed by the aforesaid electric motor is measured and the operation of the electric motor is interrupted when the measured electric current drops below a predetermined threshold value.

4. A method as claimed in claim 3, wherein when the measured value of the electrical current absorbed by the electric motor drops below the aforesaid predetermined threshold value, an auxiliary petrol feed system is activated.

5. A method as claimed in claim 4, wherein the aforesaid auxiliary petrol feed system is automatically selected if the engine is started when the temperature of engine coolant liquid is lower than a predetermined minimum value, in that when the aforesaid temperature exceeds the aforesaid predetermined minimum value the fuel feed is automatically switched from petrol to LPG and in that operation with LPG feed continues until, because of the consumption of LPG in the tank, the measured absorption of the aforesaid electrical current is lower than the aforesaid predetermined threshold value, in which case the system automatically switches fuel feed from LPG to petrol.

* * * * *